(12) United States Patent
Dye

(10) Patent No.: US 7,918,774 B2
(45) Date of Patent: Apr. 5, 2011

(54) THERAPEUTIC, FITNESS, AND SPORTS ENHANCEMENT DEVICE

(75) Inventor: Kipp K. Dye, Natick, MA (US)

(73) Assignee: Performance Solutions, LLC, Natick, MA (US)

( * ) Notice: Subject to any disclaimer, the term of this patent is extended or adjusted under 35 U.S.C. 154(b) by 51 days.

(21) Appl. No.: 11/827,361

(22) Filed: Jul. 11, 2007

(65) Prior Publication Data

US 2008/0090707 A1 Apr. 17, 2008

Related U.S. Application Data (60) Provisional application No. 60/831,726, filed on Jul. 18, 2006.

(51) Int. Cl.
A63B 21/00 (2006.01)

(52) U.S. Cl. ......................................................... 482/132

(58) Field of Classification Search .................. 482/23, 482/91, 132, 148, 140; 5/417, 690, 901–902, 5/930, 630, 652, 655.3, 631–632, 710, 713, 5/731–732, 637, 644, 628, 648, 425; 137/223; 606/240; 601/121, 118–120, 127–129, 19; 128/845, 80, 856, 878; 264/176.1, 212; 2/16, 2/125, 169; 602/63; 15/230.11; 150/118–119; 401/197

See application file for complete search history.

(56) References Cited

U.S. PATENT DOCUMENTS

| | | | | |
|---|---|---|---|---|
| 2,037,495 A * | 4/1936 | Brogan | ........................ | 601/118 |
| 2,416,471 A * | 2/1947 | De Chappedelaine | .......... | 440/27 |
| 2,994,327 A * | 8/1961 | Otto et al. | ..................... | 132/245 |
| 3,095,337 A * | 6/1963 | Chase | ........................ | 138/155 |
| 3,419,268 A * | 12/1968 | Bellet | .......................... | 482/132 |
| 3,547,112 A * | 12/1970 | Courtney | ....................... | 602/21 |
| 3,628,790 A * | 12/1971 | Gordon | ........................... | 482/15 |
| 3,684,618 A * | 8/1972 | Geschwender | ............... | 156/361 |
| 4,755,408 A * | 7/1988 | Noel | .......................... | 428/36.5 |
| 5,359,739 A * | 11/1994 | Rains et al. | .................. | 5/81.1 R |
| 5,411,470 A * | 5/1995 | Liptak et al. | .................. | 601/118 |
| 5,544,377 A * | 8/1996 | Gostine | ............................ | 5/630 |
| 5,675,850 A * | 10/1997 | Schmitt | ............................ | 5/630 |
| 5,824,013 A * | 10/1998 | Allen | .......................... | 606/240 |
| 5,829,832 A * | 11/1998 | Molee et al. | .................. | 297/397 |
| 5,857,232 A * | 1/1999 | Mahdavi | ........................... | 5/655 |
| 5,904,406 A * | 5/1999 | Stewart | ......................... | 297/397 |
| 5,937,461 A * | 8/1999 | Dombrowski et al. | ........... | 5/655 |
| 6,000,079 A * | 12/1999 | Dranger | ........................... | 5/706 |
| D447,376 S * | 9/2001 | Kramer | .......................... | D6/601 |
| 6,449,788 B1 * | 9/2002 | Nichols | ............................ | 5/636 |
| 6,536,057 B2 * | 3/2003 | Fennell et al. | .................... | 5/632 |
| 6,604,789 B1 * | 8/2003 | Downing | ....................... | 297/227 |
| 6,694,550 B2 * | 2/2004 | Lee | .................... | 5/632 |

(Continued)

OTHER PUBLICATIONS

"Hand Held Massage Tool—Dr. Riter ShiatsuRoll Back and Body Massage Roller Tool", http://www.comfortchannel.com/prod.itml/icOid/1827, 4 pages, date unknown.

*Primary Examiner* — Lori Baker (74) *Attorney, Agent, or Firm* — Roy J. Coleman (57) ABSTRACT

A therapeutic, fitness, and sports enhancement device including a cylindrically shaped body having a plurality of shaped projections configured to enhance mobilization of soft tissue and optimize body core strength and balance training.

23 Claims, 7 Drawing Sheets

U.S. PATENT DOCUMENTS

| | | | |
|---|---|---|---|
| 6,708,353 B2 * | 3/2004 | Han | 5/632 |
| 6,764,456 B1 * | 7/2004 | Doherty | 601/121 |
| 6,793,998 B1 * | 9/2004 | Silvestre | 428/40.1 |
| 6,817,066 B1 * | 11/2004 | Williams et al. | 16/435 |
| 6,844,055 B1 * | 1/2005 | Grinshpun et al. | 428/304.4 |
| 6,990,699 B2 * | 1/2006 | Hedges | 5/652 |
| 7,086,101 B2 * | 8/2006 | Welch et al. | 5/428 |
| 7,108,646 B1 * | 9/2006 | Quick | 482/148 |
| 7,300,612 B2 * | 11/2007 | Grinshpun et al. | 264/45.9 |
| 7,311,644 B2 * | 12/2007 | Hale | 482/142 |
| D567,952 S * | 4/2008 | Fink | D24/200 |
| D567,955 S * | 4/2008 | Fink | D24/200 |
| 2003/0100417 A1 * | 5/2003 | Westwood | 482/142 |
| 2003/0126684 A1 * | 7/2003 | Han | 5/630 |
| 2004/0082449 A1 * | 4/2004 | Brown, Jr. | 482/140 |
| 2007/0138122 A1 * | 6/2007 | Shimada | 215/12.2 |
| 2008/0090707 A1 * | 4/2008 | Dye | 482/132 |
| 2009/0017995 A1 * | 1/2009 | Freiberg | 482/91 |

* cited by examiner

THERAPEUTIC, FITNESS, AND SPORTS ENHANCEMENT DEVICE

RELATED APPLICATIONS

This application claims priority to provisional application No. 60/831,726, filed Jul. 18, 2006.

FIELD OF THE INVENTION

This subject invention relates to a therapeutic, fitness and sports enhancement device.

BACKGROUND OF THE INVENTION

Conventional cylindrical foam rolls are often used for tissue mobilization, improving body core strength and balance training. When used for tissue mobilization, the user typically lies or sits on the cylindrical foam roll and moves back and forth to mobilize target soft tissue. The benefits of soft tissue mobilization include, inter alia, decreased muscle soreness, relief from joint stress, decreased neuromuscular hypertonicity, increased joint range motion, extensibility of musculotendinous junctions, increased neuromuscular efficiency, and maintenance of normal functional muscle length. These benefits enhance recovery of injuries and also maximize sports performance and result in improved fitness.

However, the completely cylindrical shape of a conventional foam roll minimizes the effect of tissue mobilization. Moreover, such a design often results in the user falling off the cylindrically shaped foam roll, which is aggravating and cumbersome.

When used for body core strength and balance training, the user typically stands or on the cylindrical foam roll device to enhance balance, coordination and core strength. However, because the user can easily fall off the cylindrical shaped foam roll, the effectiveness of the body core strength and balance training session is often minimized.

BRIEF SUMMARY OF THE INVENTION

It is therefore an object of this invention to provide a therapeutic, fitness and sports enhancing device.

It is a further object of this invention to provide such a therapeutic, fitness and sports enhancement device which maximizes mobilization of soft tissue.

It is a further object of this invention to provide such a therapeutic, fitness and sports enhancement device which enhances flexibility.

It is a further object of this invention to provide such a therapeutic, fitness and sports enhancement device which improves body core strength training.

It is a further object of this invention to provide such a therapeutic, fitness and sports enhancement device which optimizes soft tissue distensibility.

It is a further object of this invention to provide such a therapeutic, fitness and sports enhancement device which improves balance training.

It is a further object of this invention to provide such a therapeutic, fitness and sports enhancement device which enhances recovery from injury.

It is a further object of this invention to provide such a therapeutic, fitness and sports enhancement device which maximizes sports performance.

It is a further object of this invention to provide such a therapeutic, fitness and sports enhancement device which improves fitness.

This invention features a therapeutic, fitness, and sports enhancement device including a cylindrically shaped body including a plurality of shaped projections configured to enhance mobilization of soft tissue and optimize body core strength and balance training.

In one embodiment, the plurality of shaped projections may be configured to maximize mobilization of soft tissue to enhance flexibility. The plurality of shaped projections may be configured to reduce movement during body core strength and balance training. The plurality of shaped projections may be configured to optimize soft tissue distensibility. The plurality of shaped projections may include a shape chosen from the group consisting of: a curved shape, a triangle shape, a square, a notch shape, a cylindrical shape with rounded ends, and cylindrical shape with flat ends. The plurality of shaped projections may longitudinally extend over a length of the body. The plurality of shaped projections may radially extend from the body are at the same angles. The plurality of shaped projections may radially extend from the body at different angles. The plurality of shaped projections may be configured in a wave pattern. The plurality of shaped projections may be configured in a Z pattern. The plurality of shaped projections may be configured in a helical pattern. The plurality of shaped projections may be individually spaced in a predetermined pattern over the body. The predetermined pattern may include an aligned pattern of a plurality of shaped projections. The predetermined pattern may include an offset pattern of a plurality of shaped projections. The cylindrically shaped body and the plurality of shaped projections may be made of a pliable material. The pliable material may include a closed-cell foam material. The closed-cell foam material may include a chemically cross-linked polyethylene foam. The pliable material may include a material having a density in the range of about 2.0 lb/ft$^3$ to about 3.8 lb/ft$^3$. The density of the pliable material may be chosen to enhance mobilization of soft tissue and improve body core and strength training. The density of the pliable material may be chosen to maximize soft tissue mobilization and enhance flexibility. The density of the pliable material may be chosen to optimize soft tissue distensibility. The body may include a plurality of bonded sections. The body may have a length in the range of about 18 inches to about 36 inches. The body may have a diameter in the range of about 3 inches to about 15 inches.

This invention also features a therapeutic, fitness and sports enhancement device including a cylindrically shaped body including a plurality of bonded sections each having a plurality of shaped projections thereon of a predetermined type configured to enhance mobilization of soft tissue and optimize body core strength and balance training.

In one embodiment, the plurality of bonded sections may be bonded to each other using a high bonding adhesive. The plurality of shaped projections may be configured to maximize mobilization of soft tissue to enhance flexibility. The plurality of shaped projections may be configured to reduce movement during body core strength and balance training. The plurality of shaped projections may be configured to optimize soft tissue distensibility. The plurality of shaped projections may include a shape chosen from the group consisting of: a curved shape, a triangle shape, a square, a notch shape, a cylindrical shape with rounded ends, and cylindrical shape with flat ends. The plurality of shaped projections may longitudinally extend over a length of the body. The plurality of shaped projections may radially extend from the body are at the same angles. The plurality of shaped projections may radially extend from the body at different angles. The plurality of shaped projections may be configured in a wave pattern. The plurality of shaped projections may be configured in a Z pattern. The plurality of shaped projections may be configured in a helical pattern. The plurality of shaped projections may be individually spaced in a predetermined pattern over the body. The predetermined pattern may include an aligned pattern of a plurality of shaped projections. The predetermined pattern may include an offset pattern of a plurality of shaped projections. The body and the plurality of shaped projections may be made of a pliable material. The pliable material may include a closed-cell foam material. The closed-cell foam material may include a chemically cross-linked polyethylene foam. The pliable material may include a material having a density in the range of about 2.0 lb/ft$^3$ to about 3.8 lb/ft$^3$. The density of the pliable material may be chosen to enhance mobilization of soft tissue and improve body core and strength training. The density of the pliable material may be chosen to maximize soft tissue mobilization and enhance flexibility. The density of the pliable material may be chosen to optimize soft tissue distensibility. The body may include a plurality of bonded sections. The body may have a length in the range of about 18 inches to about 36 inches. The body may have a diameter in the range of about 3 inches to about 15 inches.

This invention also features a therapeutic, fitness, and sports enhancement device including a cylindrically shaped core and an overlay about the core including a plurality of shaped projections configured to enhance mobilization of soft tissue and optimize body core strength and balance training.

In one embodiment, the plurality of shaped projections may be configured to maximize mobilization of soft tissue to enhance flexibility. The plurality of shaped projections may be configured to reduce movement during body core strength and balance training. The plurality of shaped projections may be configured to optimize soft tissue distensibility. The plurality of shaped projections may include a shape chosen from the group consisting of: a triangle shape, a curved shape, a square shape, a notch shape, a cylindrical shape with rounded ends, and cylindrical shape with flat ends. The plurality of shaped projections may radially extend from the overlay at the same angle. The plurality of shaped projections may radially extend from the overlay at different angles. The plurality of shaped projections may longitudinally extend over a length of the overlay. The plurality of shaped projections may be configured in a wave pattern. The plurality of shaped projections may be configured in a Z pattern. The plurality of shaped projections may be configured in a helical pattern. The plurality of shaped projections may be individually spaced in a predetermined pattern over the body. The predetermined pattern may include an aligned pattern of a plurality of shaped projections. The predetermined pattern may include an offset pattern of a plurality of shaped projections. The core may be made of a pliable material. The overlay may be made of a pliable material. The pliable material may include a closed-cell foam material. The closed-cell foam material may include a chemically cross-linked polyethylene foam. The overlay may be made of an extruded material. The overlay may be made of a die cast material.

The subject invention results from the realization that a therapeutic, fitness and sports enhancement device that maximizes soft tissue mobilization to enhance flexibility and soft tissue distensibility and improve body core strength and balance training is effected, in one embodiment, with a cylindrically shaped body including a plurality of shaped projections configured to enhance mobilization of target soft tissue and provide stability to improve body core strength and balance training.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
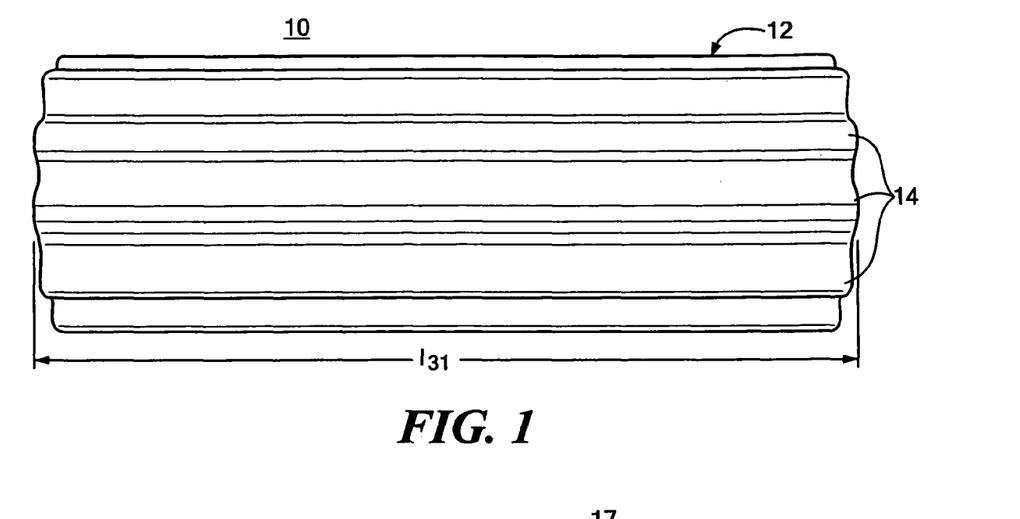
FIG. 1 is a three-dimensional perspective side-view of one embodiment of the therapeutic, fitness and sports enhancement device of this invention.
Figure 2:
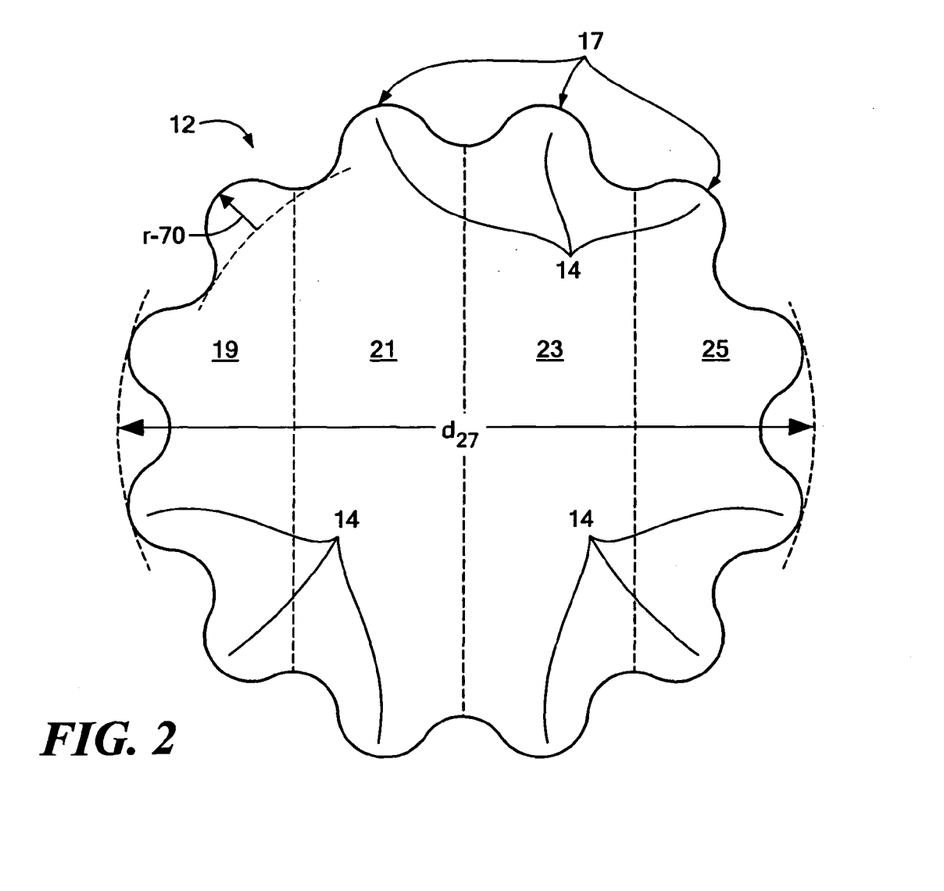
FIG. 2 is a schematic end-view showing in further detail one example of the plurality of shaped projections shown in FIG. 1.
Figure 3:
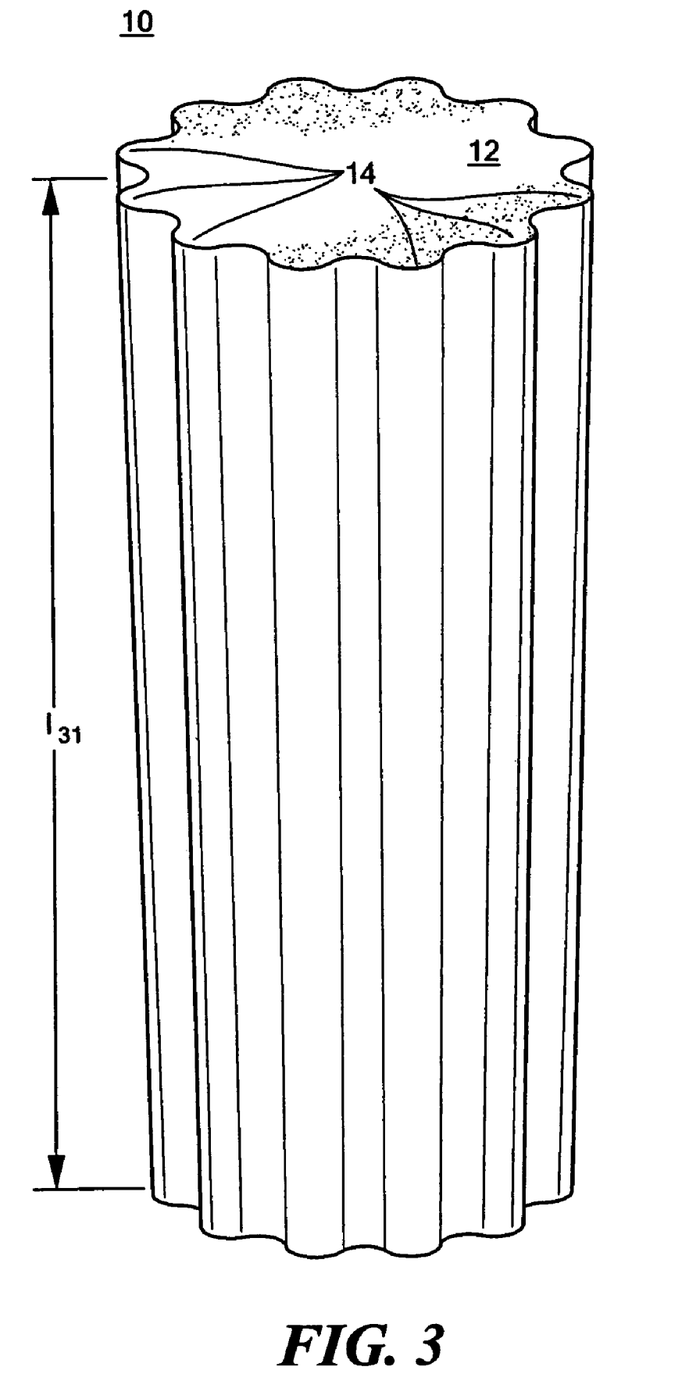
FIG. 3 is another three-dimensional perspective side-view of the therapeutic, fitness and sports enhancement device shown in FIGS. 2 and 3.

There is shown in FIG. 1, one embodiment of therapeutic, fitness, and sports enhancement device 10 of this invention including cylindrically shaped body 12 having a plurality of shaped projections 14 configured to enhance mobilization of target soft tissue and improve body core strength and balance training. FIG. 2, where like parts have been given like numbers, shows in further detail one exemplary shape of the plurality of shaped projections 14 shown in FIG. 1. In this example, the shaped projections 14 have a rounded shape, indicated at 17. FIG. 3 shows yet another view of device 10 with cylindrically shaped body 12 and the rounded shape of the plurality of shaped projections 14.

Figure 4:
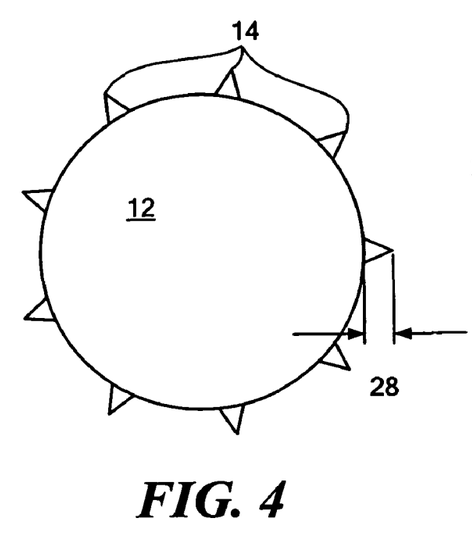
FIG. 4 is a schematic end-view showing another example of the plurality of shaped projections of this invention.
Figure 5:
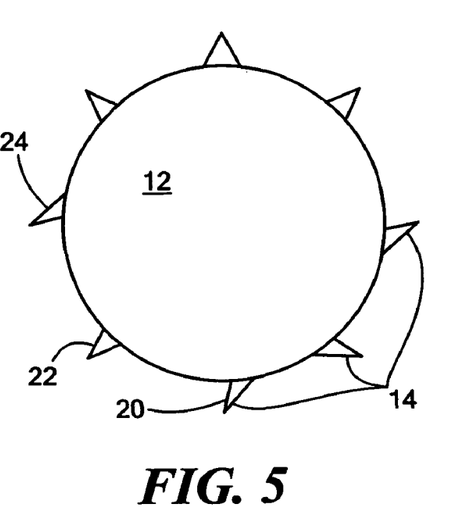
FIG. 5 is a schematic end-view showing the plurality of shaped projections shown in FIG. 4 extending at different angles.
Figure 6:
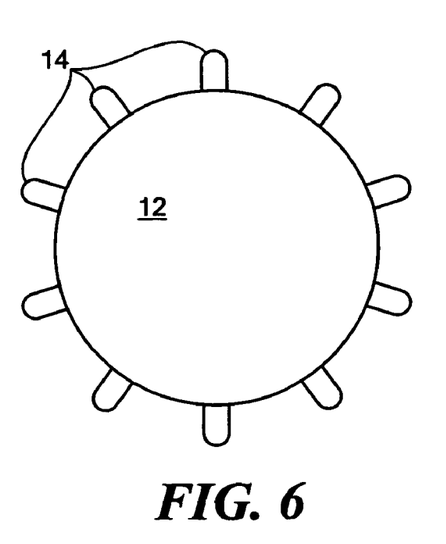
FIG. 6 is a schematic end-view of another example of the plurality of shaped projections of this invention.
Figure 7:
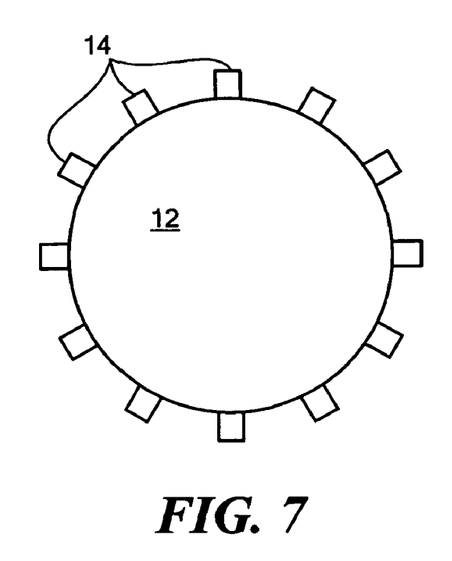
FIG. 7 is a schematic end-view of yet another example of the plurality of shaped projections of this invention.

In other designs, the plurality of shaped projections 14 may have triangle-shaped, as shown in FIG. 4. In this example, the plurality of shaped projections 14 radially extends from body 12 at the same angle. In other examples, the plurality of shaped projections 14, FIG. 5, may radially extend from body 12 at different angles, as indicated at 20, 22, and 24. In other examples, the plurality of shaped projections 14, FIG. 6, may be cylindrically shaped with rounded ends or may also be cylindrically shaped with flat ends, as shown in FIG. 7.

Figure 8A:
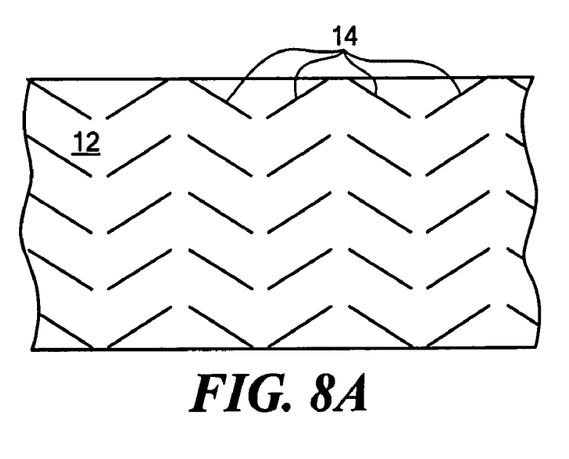
FIGS. 8A-8D are schematic top-views showing exemplary longitudinal patterns of the plurality of shaped projections on the body shown in FIGS. 1-7.
Figure 8B:
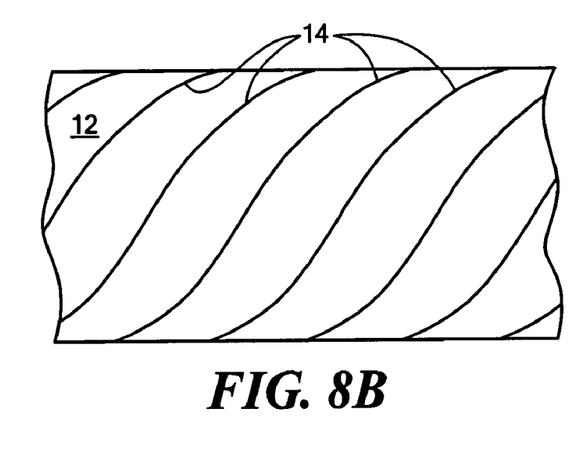
Figure 8C:
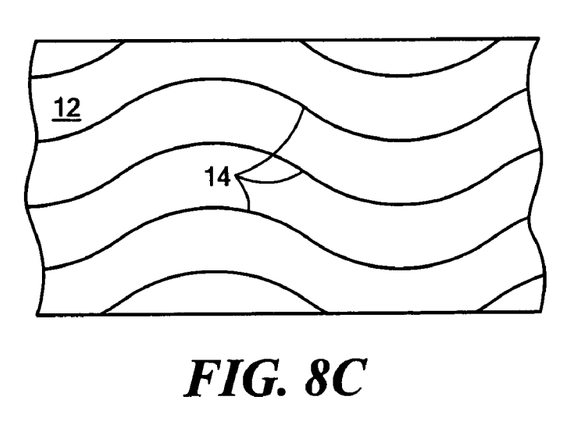
Figure 8D:
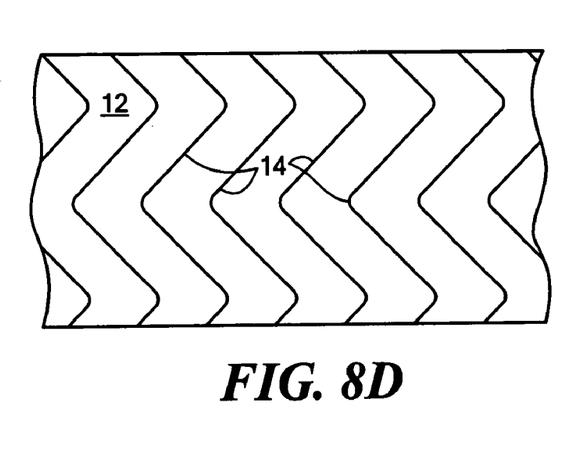
Figure 9A:
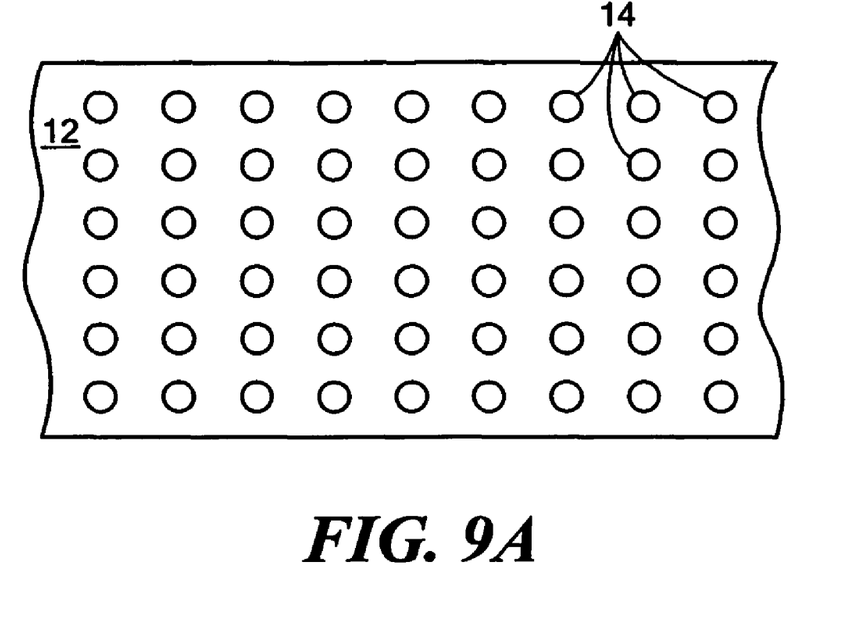
FIGS. 9A and 9B are schematic top-views showing exemplary individual patterns of the plurality of shaped projections shown in FIGS. 1-7.
Figure 9B:
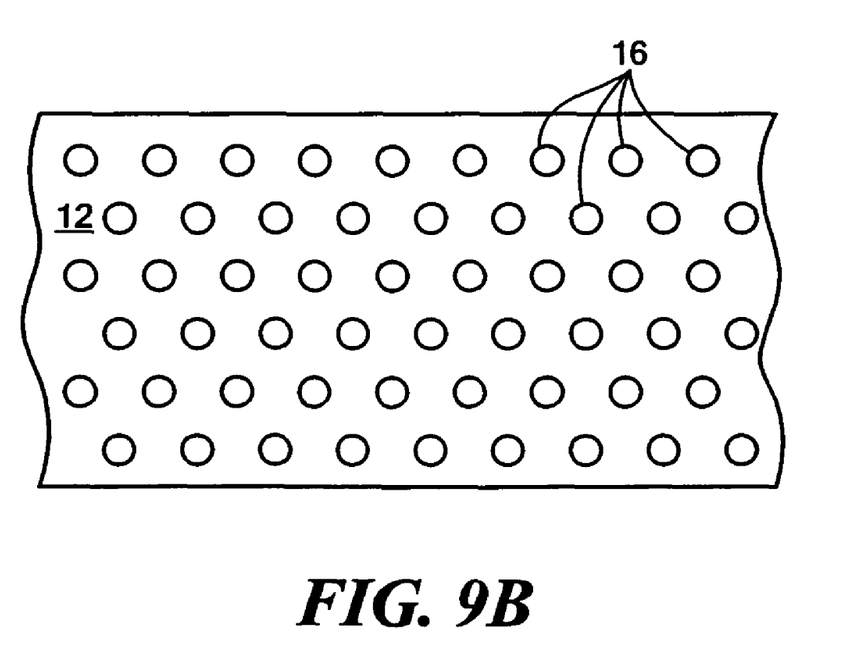

The plurality of shaped projections 14 as shown in FIGS. 1-7 may also longitudinally extend over the length, 1-31, FIG. 1, of body 12, e.g., in a right angle pattern, as shown in FIG. 8A, in a helical pattern, as shown in FIG. 8B, in a wave pattern, as shown in FIG. 8C, or in a Z pattern, as shown in FIG. 8D. In other designs, the plurality of shaped projections 14 may extend over body 12 in an individual pattern as shown in FIGS. 9A and 9B.

Preferably, each of the plurality of shaped projections 14 is configured to maximize mobilization of soft tissue to enhance flexibility and/or optimize soft tissue distensibility.

The result is therapeutic fitness and sports enhancement device 10 with cylindrically shaped body 12 having the plurality of shaped projections 14 of this invention effectively mobilizes target soft tissue. Typical target soft tissue mobilized by the plurality of shaped projections 14 includes muscles, tendons, ligaments fascia of the human body and the like. Mobilization of soft tissue by the plurality of shaped projections 14 massages soft tissue and breaks up scar tissue. This increases flexibility of soft tissue, decreases muscle soreness, relieves joint stress, decreases neuromuscular hypertonicity, increases joint range motion and extensibility of musculotendonous junctions, optimizes soft tissue distensibility, increases neuromuscular efficiency, and helps maintain normal functional muscle length. These benefits enhance recovery of injuries when used as a therapeutic tool, maximize sports performance, and improved fitness.

Therapeutic fitness and sports enhancement device 10 with cylindrically shaped core 12 and the plurality of shaped projections 14 also effectively provide for body core strength and balance training. This is because the plurality of shaped projections 14 reduces movement of device 10 which help prevent the user from falling off device 10 when performing body core strength and balance training exercises.

In one embodiment, cylindrically shaped body 12 and the plurality of shaped projections 14, FIGS. 1-9B, are made of a pliable material, e.g., a closed-cell foam material, preferably a chemically, cross-linked closed-cell polyethylene foam, such as MINICEL® L200, L300, or L380, available from Sekisui Voltek (Lawrence, Mass.). Other similar type pliable materials and closed-cell foams known to those skilled in the art may also be utilized. To manufacture therapeutic fitness and sports enhancement device 10, a large sheet of the pliable material is cut using a high speed vertical band saw which forms cylindrically shaped body 12 and the plurality of shaped projections 14 thereon.

In another embodiment, cylindrically shaped body 12, FIGS. 1-7 includes a plurality of bonded sections, e.g., sections 19, 21, 23, and 25, FIG. 2, each having a plurality of shaped projections 14 thereon of a predetermined type, e.g., as shown in any of FIGS. 1-9B. Each of sections 19-25 is similarly made of a pliable material, e.g., closed-cell polyethylene foam, such as MINICEL® L200, L300, or L380, discussed above, and are bonded to each other using a high bonding adhesive. The sheets of the pliable material used for the plurality of bonded sections, e.g., sections 19-25, typically has predetermined width, e.g., about 2" to 3", or up to 4" up to 4 inches, although the sheets of pliable material and the resulting width of sections 19-25 may have any width as known to those skilled in the art. The shape of the plurality of shaped projections 14 and cylindrically shaped body 12 made of sections 19-25 is similarly formed using a high speed versatile band saw, as discussed above.

Typically, cylindrically shaped body 12 has a diameter, d-27, FIG. 2, in the range between about 3" to about 15". Cylindrically shaped body 12 typically has a length, 1-31, between about 18" and 36".

Each of the plurality of shaped projections 14, FIGS. 1-9B, preferably radially, extends about ⅜, " to about 1" from body 12, e.g., as shown by r-70, FIG. 2. The plurality of shaped projections 14 may radially extend more or less than ⅜, " to about 1" from body 12, as known to those skilled in the art.

In addition to the shape of the plurality of shaped projections 14, the density of the pliable material for body 12 and the plurality of shaped projections 14 may be chosen to maximize soft tissue mobilization, improve body core and strength training, enhance flexibility, and/or optimize soft tissue distensibility. In one example, the density of the pliable material, e.g., a closed-cell polyethylene foam such as MINICEL® L200, L300, or L380, is in the range about 2.0 to 3.8 lb/ft$^3$.

Figure 10:
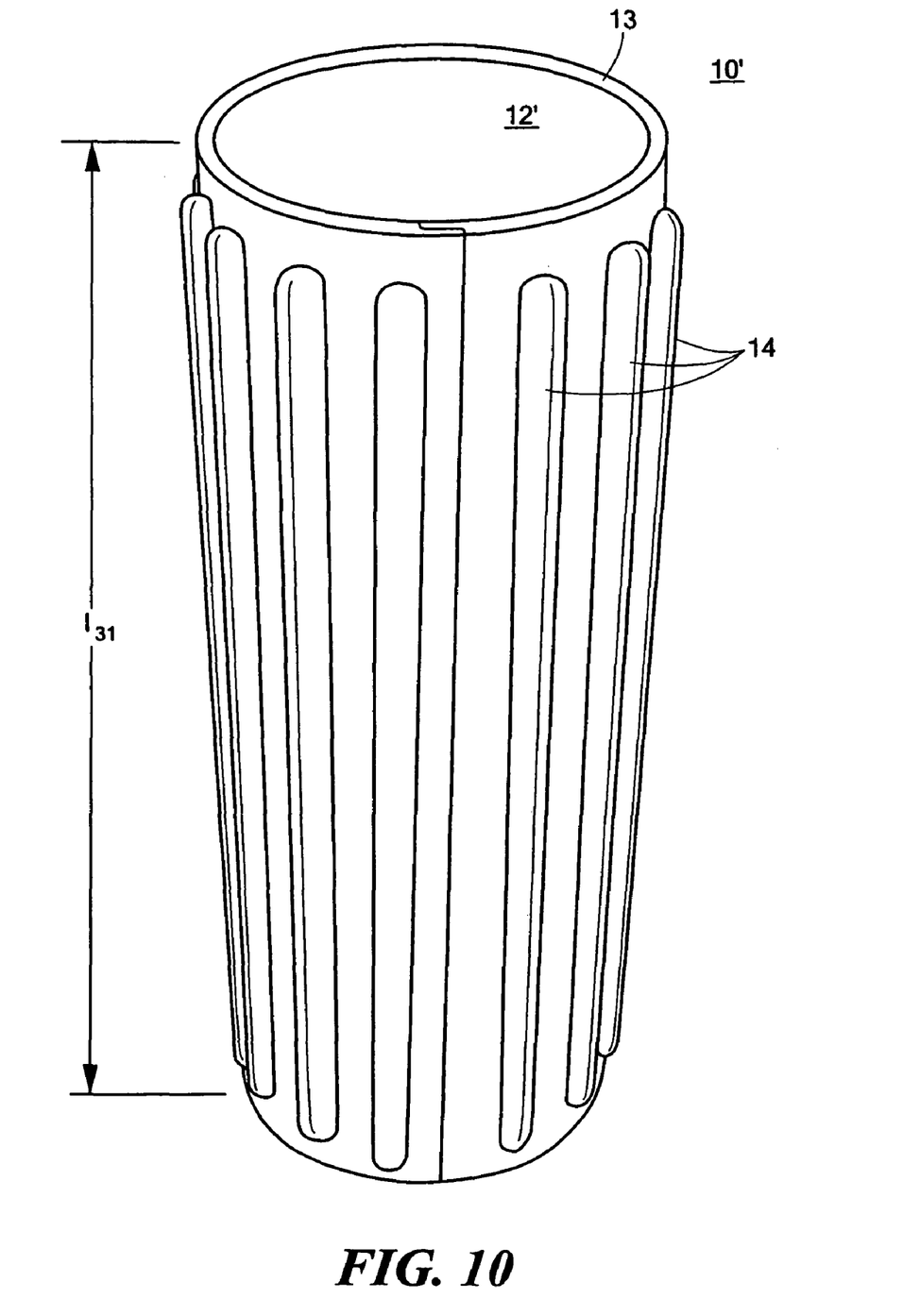
FIG. 10 is a three-dimensional perspective side view of another embodiment of the therapeutic, fitness and sports enhancement device of this invention.

In yet another embodiment, therapeutic, fitness, and sports enhancement device 10', FIG. 10 of this invention includes cylindrically shaped core 12 and overlay 13 about core 12. Overlay 13 includes a plurality of shaped projections 14, similar as discussed above with reference to FIGS. 1-9B, which are shaped to enhance mobilization of target soft tissue, improve body core strength and balance training, enhance flexibility and/or optimize soft tissue distensibility. Core 12 is similarly made of pliable material, as discussed above, e.g., a closed-cell polyethylene foam such as MINICEL® L200, L300, or L380. Overlay 13 is typically made of MINICEL® L200, L300, or L380, and the plurality of shaped projections 14 thereon are formed from an extrusion process or a die cast process or cut by a high speed foam band saw, as known to those skilled in the art.

Figure 11:
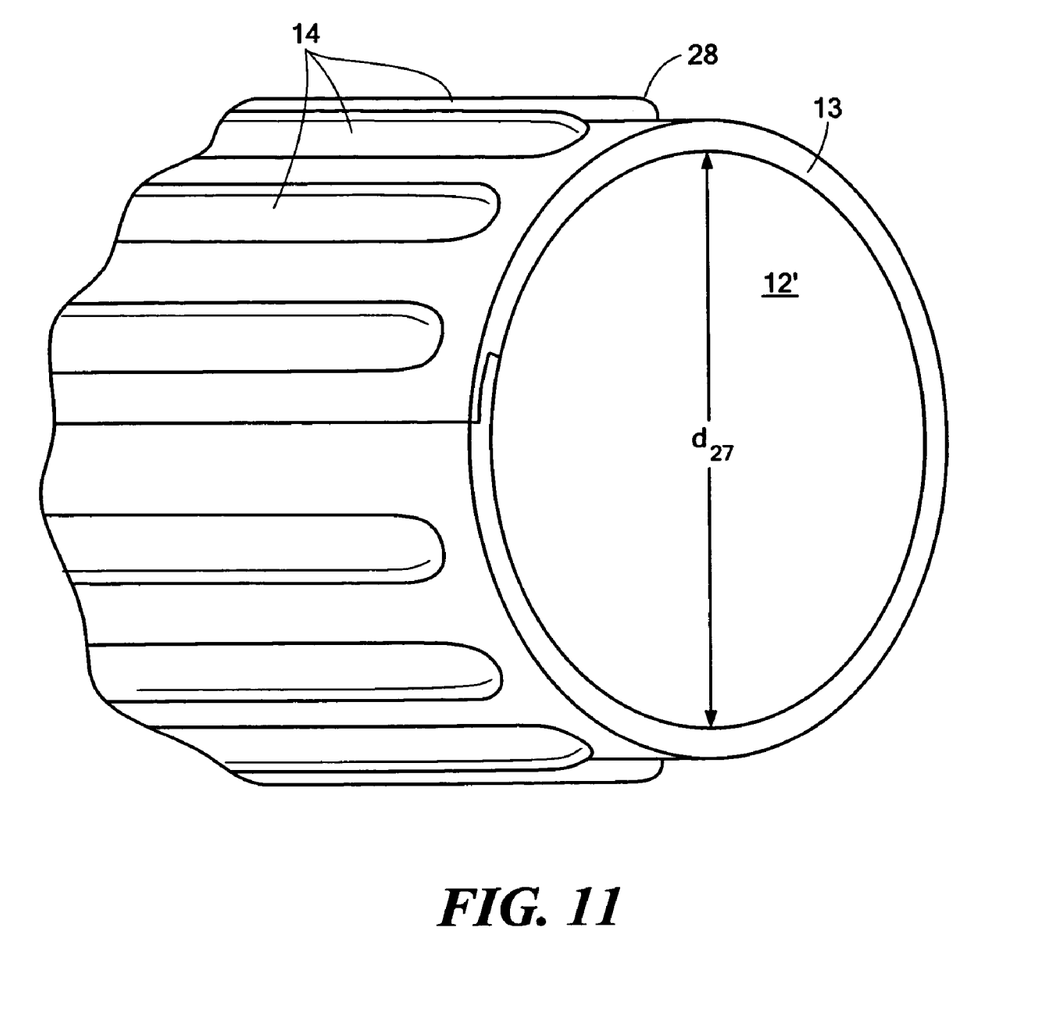
FIG. 11 is a three-dimensional perspective end view of the therapeutic, fitness and sports enhancement device shown in FIG. 10.

In one example, the plurality of projections on overlay 13, FIG. 11, radially extends about ⅜, " from overlay 13, as indicated at 28. In other designs, protrusions 16 may extend more or less than ⅜, " from overlay 13 as needed to maximize soft tissue mobilization; and improve balance and core strength training, enhance flexibility and optimize soft tissue distensibility. In this example, therapeutic fitness, and sports enhancement device 10', is approximately 18" in length as indicated by 1-31, FIG. 10, and has a diameter, d-27, FIG. 11, of about 6". Device 10" may be longer or shorter than 18" in length and have a diameter larger or smaller than 6", as known by those skilled in the art.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. Therapeutic, fitness, and sports enhancement device comprising:
   a completely solid cylindrically shaped body including a length, closed ends, and a uniform diameter, the body including a plurality of projections shaped to mobilize soft tissue by extending into the soft tissue of a user, each said projection extending upwardly from the solid body and extending entirely straight and parallel to a longitudinal axis of the body and to other like projections and extending the entire length of the body.

2. The device of claim 1 wherein said projections are shaped to break up scar tissue by extending into the soft tissue of a user.

3. The device of claim 1 wherein said projections are shaped to massage soft tissue by extending into the soft tissue of a user.

4. The device of claim 1 wherein said projections are shaped to enhance tissue distensibility by extending into the soft tissue of a user.

5. The device of claim 1 wherein said projections are shaped to increase flexibility of soft tissue by extending into the soft tissue of a user.

6. The device of claim 1 wherein said projections are shaped to decrease muscle soreness by extending into the soft tissue of a user.

7. The device of claim 1 wherein said projections are shaped to increase joint range of motion by extending into the soft tissue of a user.

8. The device of claim 1 wherein said projections are shaped to decrease neuromuscular hypotonicity hypertonicity by extending into the soft tissue of a user.

9. The device of claim 1 wherein said plurality of projections have a curved shape.

10. The device of claim 1 wherein the solid body and the plurality of shaped projections are made of a pliable material.

11. The device of claim 10 in which the pliable material includes a closed-cell foam material.

12. The device of claim 11 in which the closed-cell foam material includes a chemically cross-linked polyethylene foam.

13. The device of claim 10 in which the pliable material includes a material having a density in the range of about 2.0 $lb/ft^3$ to about 3.8 $lb./ft.^3$.

14. The device of claim 13 in which the density of the pliable material is chosen to mobilize soft tissue.

15. The device of claim 13 in which the density of the pliable material is chosen to break up scar tissue.

16. The device of claim 13 in which the density of the pliable material is chosen to massage soft tissue.

17. The device of claim 13 in which the density of the pliable material is chosen to enhance tissue distensibility.

18. The device of claim 13 in which the density of the pliable material is chosen to increase flexibility of soft tissue.

19. The device of claim 13 in which the density of the pliable material is chosen to decrease muscle soreness.

20. The device of claim 13 in which the density of the pliable material is chosen to increase joint range motion.

21. The device of claim 1 in which the solid body includes a plurality of bonded sections.

22. The device of claim 1 in which the solid body has a length in the range of about 18 inches to about 36 inches.

23. The device of claim 1 in which the solid body has a diameter in the range of about 3 inches to about 15 inches.

* * * * *